United States Patent [19]

Ariga et al.

[11] 4,141,926
[45] Feb. 27, 1979

[54] METHOD FOR PREPARING EPOXY-MODIFIED SILICON RESINS

[75] Inventors: Kinji Ariga, Tokyo; Shiro Gomyo, Annaka, both of Japan

[73] Assignee: Shin-Etsu Chemical Co., Ltd., Tokyo, Japan

[21] Appl. No.: 606,976

[22] Filed: Aug. 22, 1975

[30] Foreign Application Priority Data

Aug. 29, 1974 [JP] Japan .................................. 49-99288

[51] Int. Cl.$^2$ ...................... C08L 63/02; C08L 63/04; C08L 63/00; C08G 59/68
[52] U.S. Cl. .............................. 260/824 EP; 528/17; 528/14; 528/27; 528/26; 528/32
[58] Field of Search .................... 260/824 EP, 46.5 R, 260/836; 528/14, 27

[56] References Cited

U.S. PATENT DOCUMENTS

| | | | |
|---|---|---|---|
| 3,055,858 | 9/1962 | Frye et al. | 260/824 EP |
| 3,170,962 | 2/1965 | Tyler | 260/824 EP |
| 3,294,865 | 12/1966 | Price | 260/836 |
| 3,779,988 | 12/1973 | Rembold et al. | 260/824 EP |
| 3,899,456 | 8/1975 | Sieckhaus et al. | 260/825 |

*Primary Examiner*—Wilbert J. Briggs, Sr.
*Attorney, Agent, or Firm*—Toren, McGeady and Stanger

[57] ABSTRACT

An improved method for preparing epoxy-modified silicone resins is proposed in which the reaction catalyst is an alkali halide, such as sodium chloride and potassium chloride, or a combination of the alkali halide and an alkyl titanate, such as tetraisopropyl titanate and tetrabutyl titanate. The epoxy-modified silicon resin thus obtained is further reacted with a polybasic carboxylic acid or its anhydride. Varnishes containing these modified silicone resins can give coating films with very strong resistance to chemicals and solvents. Furthermore paints prepared with these varnishes as the vehicle are very stable, and exhibit no thixotropy even after a very long period of storage.

13 Claims, No Drawings

METHOD FOR PREPARING EPOXY-MODIFIED SILICON RESINS

FIELD OF THE INVENTION

This invention relates to a novel and improved method for the preparation of a silicone resin modified with an epoxy compound or with a carboxylic acid and an epoxy compound.

DESCRIPTION OF THE PRIOR ART

Epoxy-modified silicone resins have been widely employed as a vehicle for heat-resistant, anti-corrosive and waterproof paints by virtue of their capability of imparting to the paints such superior properties as heat-resistance, adhesivity, water-resistance, anti-corrosiveness, anti-solvent resistance and chemical resistance.

Prior art methods for the preparation of epoxy-modified silicone resins, in which an organosilicon compound with alkoxy groups or hydroxy groups directly bonded to the silicon atoms is subjected to condensation reaction by dehydration or by the elimination of alcohols with an epoxy compound in the presence of an acid catalyst, such as paratoluene sulfonic acid and trifluoroacetic acid, have had the following disadvantages.

First, the condensation or modification reaction is a reaction which proceeds inherently with difficulty compared to reactions for the preparation of organosilicon resins modified by condensation with acrylic resins, alkyd resins or polyester resins. Therefore, an epoxy-modified silicone resin tends to become gelled into a heterogeneous and opaque mass before completion of the modification reaction. Paints prepared from a silicone resin imperfectly modified with an epoxy compound as the vehicle and mixed with pigments, such as carbon black, graphite and chromium oxide, sometimes exhibit remarkable thixotropy due to poor affinity between the vehicle resin and the pigments. In addition, such paints are disadvantaged by their inferior workability and also by the resulting dull, rugged and rough coating surfaces.

Secondly, the epoxy-modified silicone resins obtainable by the prior art methods are limited in the choice of raw materials as the starting components. In order that the epoxy compounds and the organosilicon compounds can readily enter into the reaction to form modified resins, both the epoxy and organosilicon compounds must be selected from those having relatively low molecular weights; the organosilicon compounds must have alkoxy groups as the functional groups; and the organosilicon compounds must not be trifunctional but difunctional so as not to have a three-dimensional network structure within the resulting modified resin. This is because the epoxy and organosilicon compounds are little compatible to each other. The epoxy-modified silicone resins obtained under the above limitations can hardly form coating films with sufficiently high molecular weight and crosslinking density to exhibit the desired properties, such as water-resistance, anti-solvent resistance, anti-corrosiveness and chemical resistance.

OBJECT OF THE INVENTION

The object of this invention is to provide a novel and improved method for the preparation of a silicone resin modified with an epoxy compound or with an epoxy compound and a carboxylic acid, free from the above-described disadvantages.

SUMMARY OF THE INVENTION

The method in accordance with the invention comprises reacting an organosilicon compound represented by the average unit formula $$R^1_a Si(OR^2)_b O_{\frac{4-a-b}{2}} \quad (I)$$

where $R^1$ is a substituted or unsubstituted monovalent hydrocarbon group, $R^2$ is a hydrogen atom or a substituted or unsubstituted monovalent hydrocarbon group, a is a positive number equal to or larger than 0.2 but smaller than 4, and b is a positive number equal to or larger than 0.001 but smaller than 4 with the proviso that (a+b) is equal to or smaller than 4, with an epoxy compound having at least two epoxy groups per molecule, in the presence of a catalyst selected from the class consisting of at least one alkali halide represented by the general formula MX, where M is an alkali metal and X is a halogen atom.

The catalyst employed in the modification reaction may be a combination of the alkali halide with at least one alkyl titanate represented by the general formula $Ti(OR^3)_4$ where $R^3$ is an alkyl group, or a partial hydrolysis-condensate thereof.

The epoxy-modified silicone resin thus obtained can be further brought into a reaction with a polybasic carboxylic acid or an anhydride thereof to produce a silicone resin modified with an epoxy compound and a carboxylic acid.

DETAILED DESCRIPTION OF THE INVENTION

To describe the method of the present invention in further detail, the inventors have conducted extensive investigations on the condensation reaction with elimination of water or an alcohol between an organosilicon compound having hydroxy groups or alkoxy groups directly bonded to the silicon atoms and an epoxy compound. As a result, it has been established that the catalyst as defined above is very effective for the modification reaction of the organosilicon compound with the epoxy compound, so that both compounds may be not necessarily of a low molecular weight or specific molecular structure. Other effects achieved by use of the catalyst system are that condensation reactions between the molecules of the organosilicon compound themselves or between the molecules of the epoxy compound themselves can be retarded to the utmost and the desired condensation reaction between the organosilicon and epoxy compounds can proceed rapidly to yield epoxy-modified silicone resins capable of forming coating films having sufficiently high molecular weight and crosslinking density. The epoxy-modified silicone resins prepared in accordance with the method of the present invention have very excellent properties to meet various uses including the formulation of non-thixotropic paints.

The organosilicon compound employed in the method of the present invention is an organosilane or an organopolysiloxane represented by formula (I) wherein $R^1$ is a substituted or unsubstituted monovalent hydrocarbon group selected from the class consisting of alkyl groups exemplified by methyl, ethyl, propyl and butyl groups, alkenyl groups exemplified by vinyl and allyl groups and aryl groups exemplified by phenyl and tolyl groups or a halogen-substituted derivatives thereof, $R^2$ is a hydrogen atom or the same substituted or unsubstituted monovalent hydrocarbon group as in the definition of $R^1$, a is a positive number as defined by $0.2 \leq a < 4$ and b is a positive number as defined by $0.001 \leq b < 4$ with the proviso that $(a+b) < 4$.

Illustrative of the organosilicon compounds conforming to the above definition are (i) alkoxy silanes exemplified by diphenyl dimethoxysilane, dimethyl dimethoxysilane, phenylmethyl dimethoxysilane, phenyl trimethoxysilane, diphenyl diethoxysilane, dimethyl diethoxysilane, phenylmethyl diethoxysilane, phenyl triethoxysilane, diphenyl dipropoxysilane, dimethyl dipropoxysilane, phenylmethyl dipropoxysilane and phenyl tripropoxysilane, (ii) diphenylsilane diol, (iii) organopolysiloxanes prepared by known methods of partial hydrolysis-condensation of an organosilane or a combination of organosilanes selected from the class consisting of the alkoxy silanes as set forth above and organohalosilanes exemplified by methyl trichlorosilane, dimethyl dichlorosilane, phenyl trichlorosilane, diphenyl dichlorosilane, phenylmethyl dichlorosilane and propyl trichlorosilane with residual alkoxy groups or hydroxy groups directly bonded to the silicon atoms, (iv) tris(phenylmethylmethoxysiloxy)phenyl silane, (v) 1,5-dimethyl-1,3,5-triphenyl-1,3,5-trimethoxy trisiloxane, (vi) tris(phenylmethylmethoxysiloxy)vinyl silane, and (vii) linear block copolymers composed of recurring dimethylsiloxane units and diphenylsiloxane units and terminated at both chain ends with alkoxy groups directly bonded to the terminal silicon atoms.

The epoxy compounds employed in the method of the present invention as the other coreactant have no specific limitations except that at least 2 epoxy groups are present in a molecule. Their examples include allylglycidyl ether, butyl glycidyl ether, glycidyl methacrylate, 3,4-epoxy-6-methylcyclohexylmethyl-3',4'-epoxy-6'-methylcyclohexane carboxylate, dicyclopentadiene dioxide, bis(3,4-epoxy-6-methylcyclohexylmethyl)adipate, diglycidyl ester of tetrahydrophthalic acid, diglycidyl ester of hexahydrophthalic acid, diglycidyl ester of phthalic acid, phenol novolac epoxy resins, triglycidyl cyanurate, epoxy resins of bisphenol A type prepared from bisphenol A and epichlorohydrine, and other epoxy compounds obtained by partial modification of the above epoxy compounds with fatty acids. Among these, the epoxy resins of bisphenol A type are most preferred from the standpoint of economy and the properties of the resulting epoxy-modified silicone resins.

The catalyst employed in the method of the present invention is at least one alkali halide represented by the general formula MX where M is an alkali metal and X is a halogen atom, and exemplified by sodium chloride, potassium chloride and potassium bromide, or mixtures thereof. Alternatively, the catalyst may be a combination of at least one alkali halide with at least one alkyl titanate represented by the general formula $Ti(OR^3)_4$ or its partial hydrolysis-condensate, preferably having a polymerization degree up to 10. The group $R^3$ in the above formula is selected from the alkyl groups having up to 8 carbon atoms.

The catalyst to be employed is selected in accordance with the method of the present invention is selected by the kinds and proportions of the functional groups of the organosilicon compound to be modified with the epoxy compound. For example, the catalyst composed of the alkali halide, e.g. sodium chloride or potassium chloride, or a combination of the alkali halides, e.g. a mixture of sodium chloride and potassium chloride, is especially effective in the case where the functional groups of the organosilicon compound are hydroxy groups. The catalyst composed of the alkali halide or alkali halides and the alkyl titanate or its partial hysrolysis-condensate is especially effective in the case where the functional groups of the organosilicon compound are alkoxy groups, although the combined catalysts are sufficiently effective also for the hydroxy-functional organosilicon compounds. On the contrary, the catalysts composed of the alkali halides alone are not so effective for the condensation reaction involving alkoxy groups as the functional groups of the organosilicon compound, for which the combined catalysts should be employed instead.

The condensation reaction between the organosilicon compound and the epoxy compound in the presence of the catalyst in accordance with the present invention may be carried out with or without a solution of a solvent capable of dissolving both the organosilicon compound and the epoxy compound, as in the prior art methods for the epoxy-modification of silicones. The reaction temperature is preferably within the range from 120° to 180° C. It is advisable that the water or alcohol produced by the condensation are distilled off out of the reaction mixture during the course of the reaction. The proportion of the organosilicon compound to the epoxy compound in the reaction is from 10:90 to 80:20 parts by weight, or preferably from 30:70 to 60:40 parts by weight in order to obtain epoxy-modified silicone resins with the intended properties.

Next, the silicone resins modified with an epoxy compound and a carboxylic acid are prepared by reacting the epoxy-modified silicone resins obtained as above with a polybasic carboxylic acid or an acid anhydride thereof. The polybasic carboxylic acids or acid anhydride thereof suitable for the purpose are exemplified by isophthalic acid, terephthalic acid, tetrahydrophthalic acid anhydride, maleic anhydride, phthalic anhydride, fumaric acid, succinic acid, sebacic acid, adipic acid, chlorendic acid, tetrachlorophthalic acid anhydride, 1,2,3,5-benzenetetracarboxylic acid anhydride, dodecylsuccinic anhydride, hexahydrophthalic acid anhydride and methylendmethylene tetrahydrophthalic acid anhydride. They are employed either singly or in combination. Small amounts of a monobasic carboxylic acid may be employed in combination with the polybasic carboxylic acid or the acid anhydride thereof mentioned above.

The process for the reaction of the polybasic carboxylic acid or the acid anhydride thereof with the epoxy-modified silicone resins is carried out by heating their mixture at 60° to 180° C. for 1 to 6 hours with no gellation taking place, thereby to react the epoxy groups in the epoxy-modified silicone resin and the carboxyl groups in the carboxylic acid with each other to produce the objective silicone resin modified with the epoxy compound and the carboxylic acid. The polybasic carboxylic acid or the acid anhydride thereof is employed in an amount corresponding to from 0.2 to 2.0 or, preferably, from 0.5 to 1.5 carboxyl groups per epoxy group in the epoxy-modified silicone resin. It can be said that the epoxy-modified silicone resins can be further improved with respect of water-resistance, anti-corrosiveness, and anti-solvent and chemical resistance of the resulting coating films by modification with a polybasic carboxylic acid in an amount within the range as specified above.

The advantages of the method of the present invention are summarized as follows.

(1) The modification reaction of the silicone resin with an epoxy compound can be completed at a relatively low temperature and within a short time. The reaction can proceed readily even when combinations of the starting materials which have not been found suitable in the prior art methods.

In the prior art method for example, it takes 7 to 8 hours at a temperature as high as 220° C. for the reaction of tris(phenylmethylmethoxysiloxy) phenyl silane with an epoxy resin (Epikote 1001, tradename of Shell Chemicals) in the presence of p-toluenesulfonic acid as the catalyst while the same reaction takes only 4 to 5 hours at a temperature of 160° C. according to the method of the present invention.

Further, the reaction of an organopolysiloxane represented by the average unit formula $(CH_3)_{0.7}(C_6H_5)_{0.7}Si(OH)_{0.26}O_{1.17}$ with Epikote 1004 (tradename by Shell Chemicals) does not proceed smoothly with the reaction mixture becoming turbid to finally become gelled when the reaction is performed in accordance with the prior art methods. On the other hand, a perfectly clear modified silicone resin soluble in several solvents, such as ethyleneglycol monoethyl ether, can be obtained by carrying out the reaction in accordance with the method of the present invention for not more than about 12 hours at a temperature as high as 160° C.

(2) Paints prepared with the modified silicone resins obtained by the method of the present invention as the vehicle do not exhibit thixotropy. The conventional epoxy-modified silicone resins often make paints thixotropic, when certain kinds of pigments are used in combination with the vehicle resins. This tendency is especially remarkable when the pigments are heat-resistant pigments, such as carbon black, graphite and chromium oxide. Such a drawback is caused by the poor affinity of the pigments to the resins. The keypoints to overcome this defect consists in the amount of the residual hydroxy and alkoxy groups as the functional groups of the organosilicon compound, and the amount of the residual functional groups should be minimized. In addition, the formation of low molecular weight cyclic organopolysiloxanes as the byproducts should be avoided in the course of the modification reaction. In order to satisfy the above requirements, it is necessary that the catalyst and the mode of the reaction to be employed are competent to make the reaction proceed rapidly and to a sufficient extent as well as to have the organosilicon compounds polymerized into polymers with a sufficiently high molecular weight.

(3) The coating films of the paints obtained with the resin prepared by the method of the present invention possess very excellent water-resistance, anti-solvent resistance, anti-corrosiveness and chemical resistance. The method of the present invention is free from the limitations such that the organosilicon compounds and the epoxy compounds of low molecular weights should be chosen as the raw materials of the modification reaction as have been in the conventional methods. Therefore it is a great advantage that the degree of freedom is large in the choice of the starting raw materials in which conformity is satisfied between the desired properties of the resulting coating films and the combination of the starting raw materials, i.e., the organosilicon compounds and the epoxy compounds. This makes it possible to eliminate completely the disadvantages of the prior art methods.

The following examples illustrate the present invention.

EXAMPLE 1

A mixture consisting of 200 g of tris(phenylmethylmethoxy)phenyl silane, 800 g of Epikote 1004 (tradename for an epoxy resin, owned by Shell Chemicals) having an epoxy equivalent of about 950 and an average molecular weight of 1,400, and 250 g of xylene was heated to 110° C. to form a clear solution. Into the solution were added 1.5 g of tetrabutyl titanate and 13 g of sodium chloride as the binary components of the catalyst system, and the temperature was further raised with stirring. Methanol began to distil out when the temperature reached about 125° C. and the xylene initially added and the methanol produced by the condensation reaction were removed as distillate from the reaction mixture by further increasing the temperature. The reaction was continued by keeping the temperature at 150° C. until no more distillate came out. The reaction time was 2 hours in the step of temperature elevation from 125° C. to 150° C. and 4 hours at 150° C., after which the resin was perfectly clear. Thereupon 820 g of ethyleneglycol monobutyl ether was added to dissolve the resin and the resulting solution was filtered to give clear, light yellow varnish. The gellation time of the varnish was 90 seconds on a hot plate at 200° C., evidencing the thermosetting nature of the resin. The solid content, viscosity at 25° C. and acid value of the varnish were 50.1%, 830 centistokes and 0.4, respectively.

To the varnish above obtained was added carbon black (furnace black) in an amount of 5 parts by weight per 100 parts by weight of the resin solid in the varnish, and the mixture was milled on a ball mill to give a black paint. This paint was stored in a tightly-stoppered glass bottle at room temperature and tested for the appearance of thixotropy from time to time during storage.

The testing method for thixotropy was as follows. A glass rod was gently dipped into and pulled up from the paints. When the drop of the paint falling from the tip of the glass rod was stringy, the paint was considered to be non-thixotropic and when the drop of the paint on the tip of the glass rod was hanging from the tip as a droplet, the paint was considered to have become thixotropic. The appearance of thixotropy was tested in a similar manner for the paints prepared with the pigments of mixed oxides of cobalt, copper and iron (hereinafter called the mixed oxides) or titanium dioxide of anatase type with the mixing ratios of 40 parts by weight of the mixed oxides or 50 parts by weight of the titanium dioxide per 100 parts by weight of the solid resin in the varnish.

When the appearance of thixotropy could not be determined definitely by the glass rod test above, an alternative testing method was employed. Namely, a test piece of 5 cm by 10 cm tin plate was flow-coated with the paint, air-dried sufficiently within about 60 minutes and subjected to curing at 150° to 200° C. for 30 minutes. Then the gloss of the coated surface was compared with that obtained by use of the paint immediately after preparation to measure the retention ratio of the gloss after storage of the paint, and the paint was considered to have become thixotropic when the retention of the gloss was less than 75% of the initial value. The period to the appearance of thixotropy was more than 6 months for all of the paints with 3 kinds of the pigments above mentioned.

The anti-solvent resistance and the chemical resistance of the coating films of the varnish were tested for the test pieces of steel coated with the varnish to be tested and cured at 150° C. for 1 hour. The test pieces showed no adverse change after 2 hours of dipping in gasoline at 25° C., after 4 days of spraying with sea water, or after 4 days of dipping in 5% aqueous solution of sodium hydroxide at 25° C.

EXAMPLE 2

A mixture consisting of 48 g of diphenyldimethoxysilane, 352 g of Epikote 1007 (tradename for an epoxy resin, owned by Shell Chemicals) having an epoxy equivalent of about 1,900 and an average molecular weight of 2,900, 4 g of potassium chloride and 0.4 g of tetrabutyl titanate in 100 g of toluene was heated with stirring to be dissolved together. The distilling out of methanol along with toluene began when the temperature of the reaction mixture reached 145° C. and the reaction was continued at 170° C. until the modified resin under reaction became clear. The reaction time was 60 minutes in the step of temperature elevation from 145° C. to 170° C. and 7 hours at 170° C. The thus modified resin while hot was poured over a film of polytetrafluoroethylene laid over an iron tray, and then cooled to solidify into slightly yellowish solid resin, having a melting point of 128° C.

EXAMPLE 3

A mixture consisting of 300 g of xylene solution containing 70% by weight of an organosilicon compound expressed by the average unit formula $(C_6H_5)_{0.6}(CH_3)_{1.0}Si(OH)_{0.23}O_{1.088}$ and 490 g of Epikote 1001 (tradename for an epoxy resin, owned by Shell Chemicals) having an epoxy equivalent of about 480 and an average molecular weight of about 900 was added into 380 g of xylene and heated to 80° C. with stirring to be dissolved together. Then 4.5 g of potassium chloride was added to the mixture and the temperature was raised to 147° C., where the reaction was continued, removing all water produced out of the reaction mixture, for about 10 hours, after which the resin became clear. The reaction mixture was cooled and diluted with xylene to a solid content of 50%, followed by filtration to give a clear, light yellow varnish having a viscosity of 230 centistokes at 25° C. This varnish was processed into paints by addition of the 3 kinds of the pigments employed in Example 1. These paints were all very stable for a long period of storage without the appearance of thixotropy.

EXAMPLE 4

A mixture consisting of 400 g of tris(phenylmethylmethoxysiloxy)phenyl silane, 600 g of Epikote 1001 and 250 g of xylene was heated to 100° C. to become dissolved together. Then 13 g of sodium chloride and 1.5 g of tetraisobutyl titanate were added with stirring and the temperature was raised to 150° C., where the reaction took place, removing all methanol produced out of the reaction mixture, for about 4 hours, after which the resin under reaction became perfectly clear and the reaction was stopped. The resin after completion of the reaction was diluted with xylene to form a clear, light yellow varnish having a solid content of 50% and a viscosity of 180 centistokes at 25° C. This varnish was processed into a paint by addition of carbon black in an amount of 10% by weight and milling on a ball mill. The test for thixotropy as in Example 1 resulted in no thixotropy appearing after 4 months of storage.

EXAMPLE 5

A mixture consisting of 1.0 mole of methyltrichlorosilane, 4.5 moles of dimethyldichlorosilane, 3.0 moles of phenyltrichlorosilane, 1.5 moles of diphenyldichlorosilane and 3,000 g of xylene was dropped over a period of 40 minutes onto 4,000 g of water with stirring to effect the hydrolysis of the silanes. Such dropping was commenced at a temperature of 5° C. and ended at 10° C. Thereupon, the reaction solution was kept at 7° C. for 1 hour to complete the hydrolysis reaction.

Thereafter the reaction mixture was washed with water repeatedly until the pH of the aqueous layer became to have a value of 5 to 6. The organic layer separated from the aqueous layer was a solution of the hydrolyzates of the mixed silanes in xylene. The moistened organic solution thus obtained was heated under reflux at 140° C. for 1 hour to remove the intermixed water together with the water produced by the condensation reaction. Then the reaction mixture was concentrated with part of the xylene stripped off by distillation under reduced pressure at about 120° C. and made to have a solid content of 70% by addition of xylene, followed by filtration to remove foreign matters. The viscosity of the solution was 65 centistokes at 25° C. The composition of the organopolysiloxane contained in the solution was one expressed by the following average unit formula.

$(C_6H_5)_{0.6}(CH_3)_{1.0}Si(OH)_{0.23}O_{1.085}$

A mixture consisting of 300 g of Epikote 1001, 429 g of the 70% organopolysiloxane solution obtained above and 271 g of xylene was heated to 70° C. to be dissolved together. At this stage the mixture was cloudy in white. Then 12 g of potassium chloride was added and the mixture was heated to about 148° C. under reflux of xylene. The reaction was continued for about 10 hours while all water produced by the condensation reaction was continuously removed out of the reaction mixture by distillation, to produce a perfectly clear and light yellow solution. A small portion of the resin solution was spread on a glass plate and then heated at 100° C. for about 30 minutes, to evaporate the xylene content and form a perfectly clear resin in the form of film. The modified resin as thus obtained required more than 60 minutes at 200° C. or a higher temperature before it became heat-cured. Therefore, 40 g of phthalic anhydride as a curing agent was added to the modified resin, and the mixture was heated to 130° to 140° C. until the acid value of the resin solid became 25 by the reaction with the epoxy groups, the period of time required for which was about 90 minutes. The reaction mixture was then allowed to cool down, while adding 400 g of ethyleneglycol monoethyl ether, followed by filtration to give a clear, light yellow varnish. The varnish had a solid content of 45.2%, a viscosity of 407 centistokes at 25° C. and an acid value of 24.7.

Using the above varnish and each of the same three pigments as employed in Example 1, a paint was prepared and tested for the appearance of thixotropy and for the properties of the coating films produced therefrom. As a result, no thixotropy was exhibited after the storage of more than 6 months and no adverse change was found on the coating films under the same test conditions as in Example 1.

EXAMPLE 6

Modification reaction was carried out by the procedure of Example 5 with the same conditions except that the amount of potassium chloride employed as the catalyst was reduced to 9 g and 0.6 g of tetrapropyl titanate was additionally admixed to the reaction mixture. In this case, it took about 5 hours before the modified resin became clear, compared to 10 hours in the test of Example 5. Then the modified resin was admixed with phthalic anhydride and processed into a clear, light yellow varnish in a similar manner as in Example 5. This varnish had a solid content of 45.0%, a viscosity of 450 centistokes at 25° C. and an acid value of 23.8. The tests for the appearance of thixotropy of the paints prepared from the varnish and the properties of the coating films gave results as satisfactory as in Example 5.

EXAMPLE 7

A mixed solution of 3.5 moles of methyltrichlorosilane, 2.5 moles of dimethyldichlorosilane, 2.5 moles of phenyltrichlorosilane and 1.5 moles of diphenyldichlorosilane in 2,500 g of xylene was subjected to hydrolysis by being dropped over a period of about 90 minutes onto a mixture of 2,000 g of isopropanol and 3,000 g of water under agitation at controlled temperatures between 10° C. and 15° C. After completion of such dropping, agitation was continued for additional 60 minutes at room temperature, followed by separation of the organic layer from the aqueous. The organic layer was washed with water repeatedly until the pH of the aqueous layer became to have a value of 5 to 6. The organic layer thus washed was then concentrated under atmospheric pressure to give a varnish with a solid content of 70%. The organopolysiloxane in the varnish had a composition expressed by the following average unit formula.

$(C_6H_5)_{0.55}(CH_3)_{0.85}Si(OH)_{0.16}(OC_3H_7)_{0.1}O_{1.17}$

A mixture consisting of 500 g of the above varnish, 100 g of Epikote 828 (tradename for an epoxy resin, owned by Shell Chemicals) having an epoxy equivalent of about 185 and an average molecular weight of 380, 1 g each of potassium chloride and sodium chloride and 0.45 g of tetrapropyl titanate was heated to 147° C. under reflux of toluene for 3 hours while removing all water and isopropanol produced by the condensation reaction. Then the temperature of the reaction mixture was lowered to 100° C. and the reaction was further continued, after addition of 30 g of adipic acid, at 140° to 145° C. for 2 hours. After completion of the reaction and cooling, the reaction mixture was diluted with 200 g of diacetone alcohol to give a clear, light yellow varnish having a solid content of 55.3%, a viscosity of 230 centistokes at 25° C. and an acid value of 23.

This varnish was subjected to same tests as in Example 1 for the appearance of thixotropy and for the properties of the coating films to give the results as satisfactory as in Example 1.

Control 1

The procedure for the preparation of a varnish as in Example 1 was repeated with the same conditions except that the catalyst system consisted of only tetrabutyl titanate in varied amounts of 0.8 g, 1.5 g and 3.0 g instead of the binary catalyst of tetrabutyl titanate and sodium chloride, to obtain three kinds of varnishes A, B and C. With respect to the reaction time, it took about 2 hours just as in Example 1 for the temperature elevation from 125° C. to 150° C. and 6 hours at 150° C. in order to form a clear, light yellow reaction mixture. The gellation time of the varnishes at 200° C. was 103 seconds, 100 seconds or 88 seconds depending on the amount of tetrabutyl titanate given above, respectively, which was almost at the same level as in Example 1.

The solid contents, viscosities and acid values of these varnishes were as below. The viscosities were somewhat smaller than that of the varnish in Example 1.

|  | Varnish | | |
| --- | --- | --- | --- |
|  | A | B | C |
| Amount of tetrabutyl titanate, g | 0.8 | 1.5 | 3.0 |
| Solid content, % | 50.0 | 50.2 | 49.9 |
| Viscosity at 25° C, centistokes | 580 | 625 | 653 |
| Acid value | 0.4 | 0.5 | 0.8 |

The paints A', B' and C' prepared from these varnishes with the addition of each of the same pigments as used in Example 1 exhibited remarkable thixotropy after several days of storage. The paintability of these thixotropic paints was very poor, being unable to give smooth and glossy coating surfaces. The paints were found unuseful as paints of general purpose, but only useful for very limited applications.

The time limits within which these paints could be kept without the appearance of thixotropy are shown in the number of days in the following table depending upon the kinds of the pigments used. The results of tests for the properties of the coating films of these paints are also set out in the table.

|  | Paint | | |
| --- | --- | --- | --- |
|  | A' | B' | C' |
| Amount of tetrabutyl titanate contained | 0.8 g | 1.5 g | 3.0 g |
| Storage without thixotropy: | | | |
| When carbon black was used | 1 day | 1 day | 3 days |
| When the mixed oxides were used | 7 days | 10 days | 20 days |
| When titanium dioxide was used | 5 days | 5 days | 8 days |
| Properties of coating films: | | | |
| After dipping in gasoline at 25° C for 2 hrs. | Films dissolved- | | |
| After spray of sea water for 4 days | -Test plates became rusty- | | |
| After dipping in a 5% NaOH aqueous solution at 25° C for 4 days | -Films peeled off- | | |

Control 2

The procedure of Example 2 was repeated with the same conditions except that potassium chloride was omitted from the binary components of the reaction catalyst. The resulting modified resin remained cloudy, indicating that no desired reaction took place at all.

Control 3

The procedure of Example 3 was repeated with the same conditions for 48 hours except that potassium chloride as the catalyst was omitted. The resulting resin mixture did not become clear, and the paints prepared from such a cloudy resin as the vehicle, using the same pigments as in Example 3, exhibited strong thixotropy after 2 to 3 days of storage resulting in poor paintability.

Control 4

A varnish was prepared by the same formulation as in Example 4 except that the catalyst for the modification reaction was p-toluenesulfonic acid instead of the binary catalyst of sodium chloride and tetraisopropyl titanate. The varnish was processed into a paint with addition of the carbon black as the pigment. This paint exhibited thixotropy after 5 days of storage with very poor paintability.

Control 5

The reaction of the same organosilicon compound and Epikote 1001 as employed in Example 5 was carried out with just the same conditions but without the use of any reaction catalyst. As a result, it was found that the desired reaction did not take place and the reaction mixture remained cloudy throughout, indicating that the reaction mixture was merely a dispersion of the components. Part of the organosilicon compound was found gelled. Therefore no additional reaction using phthalic anhydride as in Example 5 could be undertaken for the reaction mixture, and yet the reaction mixture dissolved in ethyleneglycol monoethyl ether did not make a clear solution.

Furthermore, p-toluenesulfonic acid was employed as the catalyst in an amount of 1.2, 2.4, 4.8 or 9.6 g instead of the binary catalyst used in Example 5, resulting in the cloudiness of the reaction mixture indicating that the objective reaction did not take place. Alternatively, trifluoroacetic acid was employed as the catalyst in an amount of 0.3, 0.6, 1.2 or 4.8 g, resulting also in the cloudiness of the reaction mixture and the partial gellation of the organosilicon compound.

Control 6

The procedure of Example 6 was repeated with a single catalyst of tetrapropyl titanate, instead of the binary catalyst, in an amount of 0.15, 0.3, 0.6, 1.2 or 2.4 g. When the amount of the catalyst was 0.3 g or less, no objective reaction took place, with the reaction mixture remaining cloudy, while 0.6 g or more of the catalyst resulted in cloudy reaction mixtures with the gellation of all or part of the organosilicon compound. The varnishes thus obtained were not suitable for applications.

Control 7

The procedure of Example 7 was repeated with the same conditions except that tetrapropyl titanate was omitted from the binary catalyst. A clear, light yellow varnish thus obtained had a solid content of 55.0%, a viscosity of 165 centistokes at 25° C. and an acid value of 24. Paints prepared with this varnish as the vehicle exhibited thixotropy after 2, 5 or 7 days of storage with carbon black, the mixed oxides and titanium dioxide as the pigments, respectively. Coating films obtained from the paints were tested for their properties against gasoline, sea water and alkali solutions as done in Control 1. The results were as follows.

| | |
|---|---|
| After dipping in gasoline at 25° C for 2 hrs. | Films dissolved out |
| After spray of sea water for 2 days | Test plates became rusty |
| After dipping in a 5% NaOH aqueous solution at 25° C for 4 days | Films peeled off |

What is claimed is:

1. A method for the preparation of an epoxy-modified silicone resin comprising reacting an organosilicon compound represented by the average unit formula $$R^1_a Si(OR^2)_b O_{\frac{4-a-b}{2}}$$

where $R^1$ is a substituted or unsubstituted monovalent hydrocarbon group, $R^2$ is a hydrogen atom or a substituted or unsubstituted monovalent hydrocarbon group, a is a positive number equal to or larger than 0.2 but smaller than 4, and b is a positive number equal to or larger than 0.001 but smaller than 4 with the proviso that (a+b) is equal to or smaller than 4, with an epoxy compound having at least two epoxy groups per molecule, in the presence of a catalyst selected from the class consisting of at least one alkali halide represented by the general formula MX, where M is an alkali metal and X is a halogen atom.

2. The method as claimed in claim 1 wherein said catalyst is a combination of said alkali halide with at least one alkyl titanate represented by the general formula $$Ti(OR^3)_4$$

where $R^3$ is an alkyl group, or with a partial hydrolysis-condensate thereof.

3. The method as claimed in claim 1 wherein said organosilicon compound is selected from the class consisting of diphenyldimethoxysilane, dimethyldimethoxysilane, phenylmethyldimethoxysilane, phenyltrimethoxysilane, diphenyldiethoxysilane, dimethyldiethoxysilane, phenylmethyldiethoxysilane, phenyltriethoxysilane, diphenyldipropoxysilane, dimethyldipropoxysilane, phenylmethyldipropoxysilane, and phenyltripropoxysilane.

4. The method as claimed in claim 1 wherein said organosilicon compound is a hydrolysis-condensate of a mixture of silanes selected from organohalosilanes and alkoxysilanes.

5. The method as claimed in claim 1 wherein said organosilicon compound is selected from the class consisting of tris(phenylmethylmethoxysiloxy)phenyl silane, 1,5-dimethyl-1,3,5-triphenyl-1,3,5-trimethoxy trisiloxane, and tris(phenylmethylmethoxysiloxy)vinyl silane.

6. The method as claimed in claim 1 wherein said organosilicon compound is a linear block copolymer composed of dimethylsiloxane units and diphenylsiloxane units and having alkoxy groups directly bonded to the terminal silicon atoms.

7. The method as claimed in claim 1 wherein said epoxy compound is selected from the class consisting of 3,4-epoxy-6-methylcyclohexylmethyl-3',4'-epoxy-6'-cyclohexane carboxylate, dicyclopentadiene dioxide, bis(3,4-epoxy-6-methylcyclohexylmethyl) adipate, tetrahydrophthalic acid diglycidyl ester, hexahydrophthalic acid diglycidyl ester, phthalic acid diglycidyl ester, phenol novolac epoxy resins, triglycidyl isocyanurate, and epoxy resins of bisphenol A type.

8. The method as claimed in claim 1 wherein said organosilicon compound and said epoxy compound are employed in a proportion ranging from 10:90 to 80:20 parts by weight.

9. The method as claimed in claim 2 wherein said alkyl titanate is tetrabutyl titanate or tetraisopropyl titanate.

10. A method for the preparation of a silicone resin modified by an epoxy compound and a polybasic carboxylic acid comprising reacting said polybasic acid or an anhydride thereof with the epoxy-modified silicone resin prepared by reacting an organosilicon compound represented by the average unit formula $$R^1_a Si(OR^2)_b O_{\frac{4-a-b}{2}}$$

where $R^1$ is a substituted or unsubstituted monovalent hydrocarbon group, $R^2$ is a hydrogen atom or a substituted or unsubstituted monovalent hydrocarbon group, a is a positive number equal to or larger than 0.2 but smaller than 4, and b is a positive number equal to or larger than 0.001 but smaller than 4 with the proviso that (a+b) is equal to or smaller than 4, with an epoxy compound having at least two epoxy groups per molecule, in the presence of a catalyst selected from the class consisting of at least one alkali halide represented by the general formula MX, where M is an alkali metal and X is a halogen atom.

11. The method as claimed in claim 10 wherein said catalyst is a combination of said alkali halide with at least one alkyl titanate represented by the general formula $$Ti(OR^3)_4$$

where $R^3$ is an alkyl group, or with a partial hydrolysis-condensate thereof.

12. The method as claimed in claim 10 wherein said polybasic carboxylic acid or anhydride thereof is selected from the class consisting of isophthalic acid, terephthalic acid, tetrahydrophthalic anhydride, maleic anhydride, phthalic anhydride, fumaric acid, succinic acid, sebacic acid, 1,2,3,5-benzenetetracarboxylic acid anhydride, adipic acid, chlorendic acid, tetrachlorophthalic anhydride, dodecyl succinic acid anhydride, and hexahydrophthalic anhydride.

13. The method as claimed in claim 10 wherein said polybasic carboxylic acid or anhydride thereof is employed in an amount such that from 0.2 to 2.0 carboxyl groups are given per epoxy group in said epoxy-modified silicone resin.

* * * * *